(12) United States Patent
Yue (10) Patent No.: US 8,523,266 B2
(45) Date of Patent: Sep. 3, 2013

(54) SIDE FASTENING ASSEMBLY FOR FLEXIBLE TONNEAU COVER SYSTEM OF PICK-UP TRUCK

(75) Inventor: Shiawdar Shaun Yue, Cupertino, CA (US)

(73) Assignee: CYC Engineering, Inc., Fremont, CA (US)

( * ) Notice: Subject to any disclaimer, the term of this patent is extended or adjusted under 35 U.S.C. 154(b) by 190 days.

(21) Appl. No.: 13/097,048

(22) Filed: Apr. 28, 2011

(65) Prior Publication Data
US 2012/0274093 A1   Nov. 1, 2012

(51) Int. Cl.
*B60P 7/04* (2006.01)

(52) U.S. Cl.
USPC .............................. 296/100.16; 296/100.18

(58) Field of Classification Search
USPC .................. 296/98, 100.15, 100.16, 100.18
See application file for complete search history.

(56) References Cited

U.S. PATENT DOCUMENTS

| | | | | |
|---|---|---|---|---|
| 3,538,872 A | * | 11/1970 | Pell et al. | 112/239 |
| 4,788,922 A | * | 12/1988 | Clarius | 112/403 |
| 5,159,888 A | * | 11/1992 | Morita | 112/102.5 |
| 5,758,922 A | * | 6/1998 | Wheatley | 296/100.15 |
| 6,099,067 A | * | 8/2000 | Butterworth | 296/136.07 |
| 6,575,520 B1 | | 6/2003 | Spencer | |
| 6,719,353 B1 | * | 4/2004 | Isler et al. | 296/98 |
| 6,955,999 B1 | * | 10/2005 | Boye | 442/205 |
| 7,828,361 B1 | * | 11/2010 | Spencer | 296/98 |
| 2003/0197394 A1 | * | 10/2003 | Dimmer | 296/100.16 |
| 2011/0169296 A1 | * | 7/2011 | Schrader et al. | 296/100.15 |

* cited by examiner

*Primary Examiner* — Jason S Morrow (57) ABSTRACT

A side fastening assembly for a flexible tonneau cover system of a pick-up truck is provided and has a first fastener sewn on an elongated slat by two sewing threads. The first fastener sewn on the elongated slat can ensure the attachment strength of the first fastener, so as to elongate the lifetime of the first fastener and lower the maintenance cost thereof. The side fastening assembly further has a second fastener attached to a flexible cover material of a flexible cover assembly. The first fastener and the second fastener are engaged with each other in a case that the flexible cover material is unrolled rearward on the side rail to cover the cargo bed.

17 Claims, 7 Drawing Sheets

SIDE FASTENING ASSEMBLY FOR FLEXIBLE TONNEAU COVER SYSTEM OF PICK-UP TRUCK

FIELD OF THE INVENTION

The present invention relates to a side fastening assembly for a flexible tonneau cover system of a pick-up truck, and more particularly to a side fastening assembly for a flexible tonneau cover system of a pick-up truck having a hook and loop fastener sewn on an elongated slat.

BACKGROUND OF THE INVENTION

Traditionally, a flexible cover can be used to cover a cargo bed of a pick-up truck for protecting the cargos stored in the cargo bed. The flexible cover can be made of fabric, flexible plastic, or other sheet material, such as canvas, vinyl plastic or a weather-resistant fabric. The flexible cover is commonly secured to a metal frame on the edge of the cargo bed by means of reversible attachment. Because the pick-up truck generally are used and stored outdoors, the fabric cover and the reversible attachment means to the metal frame are exposed to the moisture, extreme heat and cold, dust, mud, rocks and other external material transported in the cargo bed. The exposure to the external material causes problems for the covering and the structure used to reversibly attach the flexible cover to the metal frame.

Figure 1:
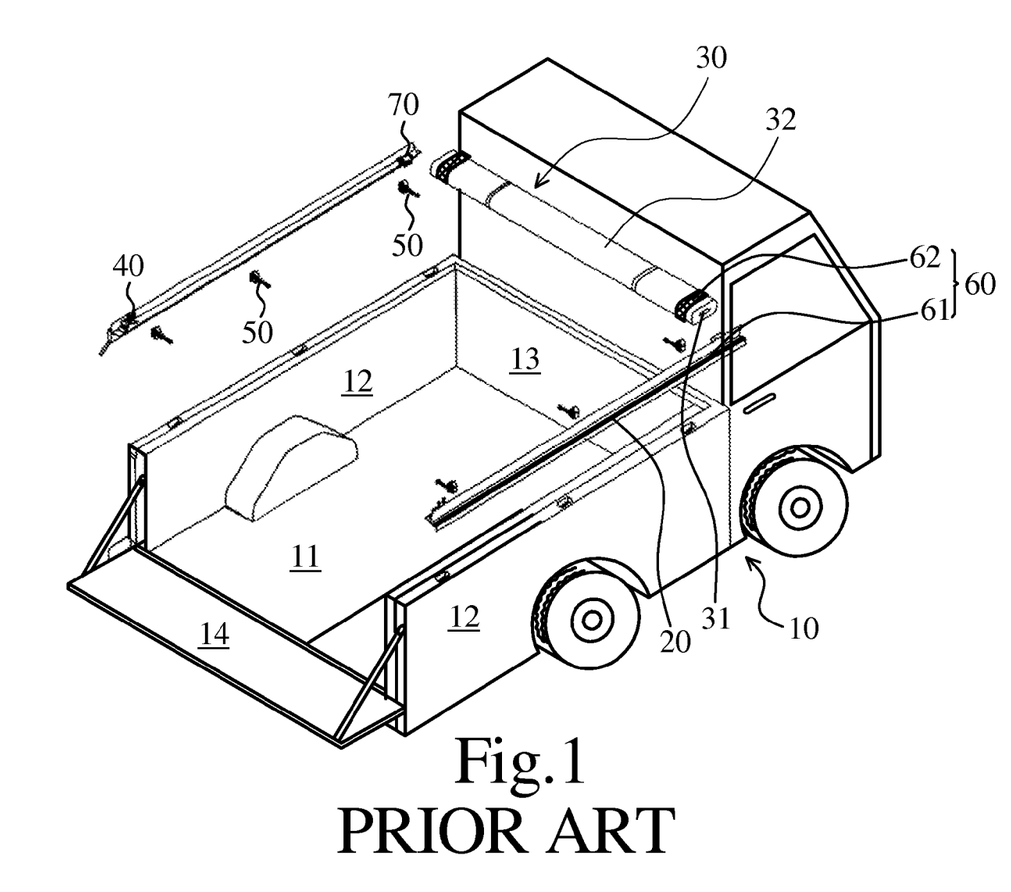
FIG. 1 is an exploded perspective view of a traditional flexible tonneau cover system of a pick-up truck.
Figure 2:
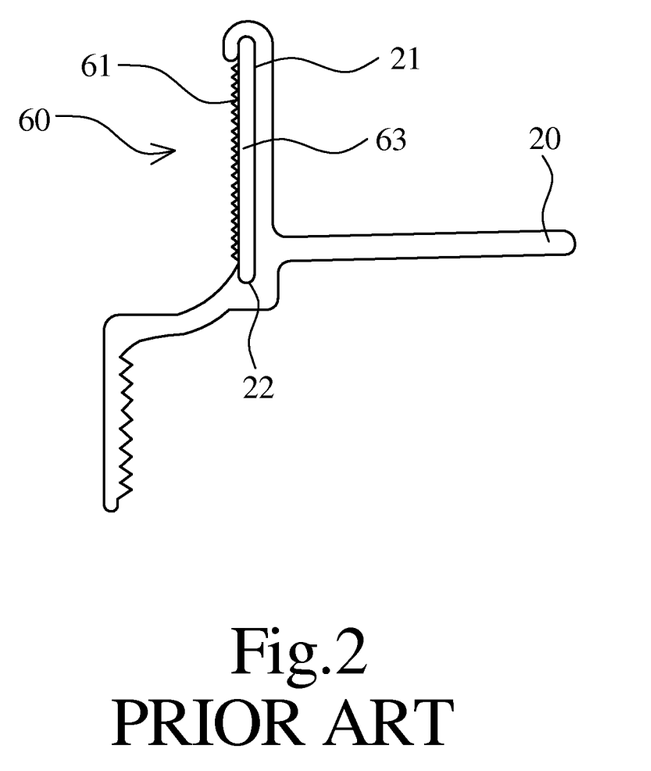
FIG. 2 is a partially cross-sectional view of a side rail and a first fastener of the traditional flexible tonneau cover system.
Figure 3:
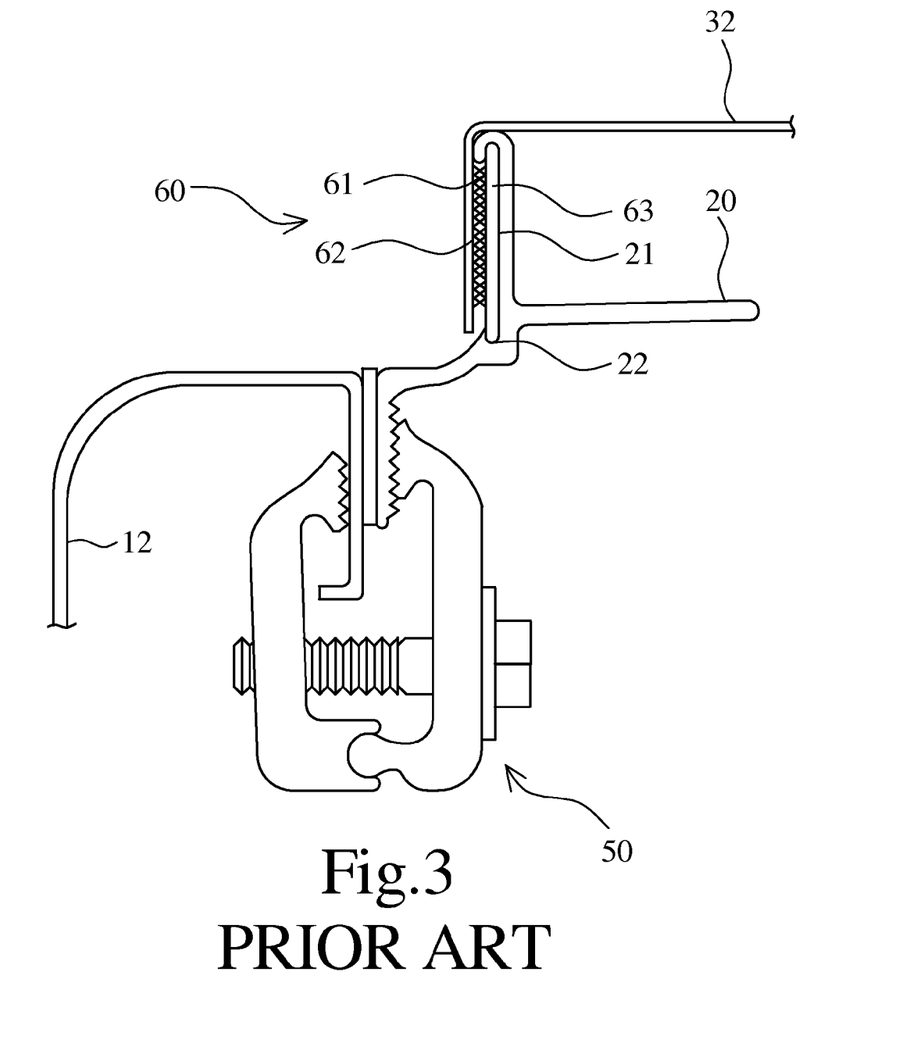
FIG. 3 is an assembled cross-sectional view of the traditional flexible tonneau cover system.

For solving the foregoing problem, please refer now to FIGS. 1, 2 and 3, U.S. Pat. No. 6,575,520 discloses a traditional flexible tonneau cover system of a pick-up truck, which uses an automatically adjustable hook and loop fastening design, wherein the flexible tonneau cover system is installed on a cargo bed 11 of a pick-up truck 10, and the flexible tonneau cover system comprises a pair of side rails 20, a flexible cover assembly 30, a rear header guide 40, a plurality of clamps 50, two hook and loop fastening systems 60 and a tension control assembly 70. The two side rails 20 are mounted on the top of two side walls 12 of the cargo bed 11 by the clamps 50; the flexible cover assembly 30 is mounted above a front wall 13 of the cargo bed 11; and the rear header guide 40 is mounted on the rear end of the two side rails 20 close to a tailgate 14 of the pick-up truck 10. The flexible cover assembly 30 has a front header 31, a flexible cover material 32 and a rear header (not-shown), wherein two ends of the front header 31 is installed on the front end of the two side rails 20; the flexible cover material 32 can be rolled up on the front header 31 or be unrolled rearward on the two side rails 20 to cover the cargo bed 11; and the rear header can be engaged with or separated from the rear header guide 40. Each of the two hook and loop fastening systems 60 has a first fastener 61 and a second fastener 62. The first fastener 61 is attached to an elongated slat 63 by adhesives, chemical bonding, thermal fusion, or the like, wherein the elongated slat 63 is slidably inserted in a channel portion 21 of the side rail 20. Meanwhile, the second fastener 62 is attached to the flexible cover material 32 by stitching, adhesives, chemical bonding, fusion, and the like.

When the flexible cover material 32 is unrolled rearward on the two side rails 20 to cover the cargo bed 11, the first fastener 61 and the second fastener 62 can be engaged with each other to provide a weatherproof seal without gaps that will protect the cargos in the cargo bed 11 from rain, wind, and blowing debris. At the same time, the tension control assembly 70 is used to automatically control the tension of the flexible cover material 32 by virtue of the inherent operation of spring plunger therein or manually control the tension by adjustments of a user, wherein the front header 31 will shift either slightly forward or slightly back, so as to achieve the desired tension. The tension can be adjusted to accommodate expansion or contraction of the flexible cover material 32 in response to climactic conditions. When the flexible cover material 32 is slightly shifted forward or backward, the combination of the second fastener 62, the first fastener 61 and the elongated slat 63 is slid along the channel portion 21 of the side rail 20 for carrying out the corresponding position adjustment.

However, there are still problems existing in the actual use of the traditional flexible tonneau cover system, as follows: During rolling up the flexible cover material 32, the second fastener 62 must be separated from the first fastener 61 adhesively attached to the elongated slat 63, wherein the separation force will damage the adhesion strength between the first fastener 61 and the elongated slat 63. After long-term use, the separation force will cause the first fastener 61 to be peeled off from the elongated slat 63. As a result, the structure of first fastener 61 and the elongated slat 63 must be replaced by a new one, resulting in increasing the usage inconvenience and the maintenance cost.

Furthermore, an inner surface of the elongated slat 63 is entirely in contact with a bottom surface of the channel portion 21 of the side rail 20. Thus, the contact area between the inner surface of the elongated slat 63 and the bottom surface of the channel portion 21 is too large. Meanwhile, an upper end and a lower end of the elongated slat 63 are entirely in contact with and clamped by two curved surface 22 of the channel portion 21. Thus, the contact area between the upper and lower ends of the elongated slat 63 and the curved surface 22 of the channel portion 21 is also too large. As a result, when the elongated slat 63 wants to slide along the channel portion 21, the elongated slat 63 may be jammed due to the tight match relationship with the bottom surface and the curved surface 22 of the channel portion 21, resulting in affecting the reliability of automatically or manually controlling the tension of the flexible cover material 32.

As a result, it is necessary to provide a side fastening assembly for a flexible tonneau cover system of a pick-up truck to solve the problems existing in the conventional technologies, as described above.

SUMMARY OF THE INVENTION

A primary object of the present invention is to provide a side fastening assembly for a flexible tonneau cover system of a pick-up truck, which comprises a first fastener sewn on an elongated slat by two sewing threads, wherein the first fastener sewn on the elongated slat can ensure the attachment strength of the first fastener, so as to elongate the lifetime of the first fastener and lower the maintenance cost thereof.

A secondary object of the present invention is to provide a side fastening assembly for a flexible tonneau cover system of a pick-up truck, wherein each of the two sewing threads on the first fastener has an exposed sewing portion projected from an inner surface of the elongated slat, so that the exposed sewing portion reduces the contact area between the inner surface of the elongated slat and the bottom surface of the channel portion of the side rail. Thus, the elongated slat can smoothly and easily slide in the channel portion, so as to increase the smooth operation and reliability of automatically or manually controlling the tension of a flexible cover material.

To achieve the above object, the present invention provides a side fastening assembly for a flexible tonneau cover system of a pick-up truck, which comprises: a first fastener sewn on an elongated slat by two sewing threads, wherein the elongated slat is slidably inserted in a channel portion of a side rail mounted on a side wall of a cargo bed of the pick-up truck, and each of the two sewing threads has an exposed sewing portion projected from an inner surface of the elongated slat to be in contact with a bottom surface of the channel portion; and a second fastener sewn on a flexible cover material of a flexible cover assembly, wherein the first fastener and the second fastener are engaged with each other in a case that the flexible cover material is unrolled rearward on the side rail to cover the cargo bed.

In one embodiment of the present invention, the first fastener is a hook fastener, and the second fastener is a loop fastener.

In one embodiment of the present invention, the first fastener is a loop fastener, and the second fastener is a hook fastener.

In one embodiment of the present invention, the elongated slat is a plastic plate having an outer surface formed with two longitudinally extending ridges for commonly defining a central slot therebetween, wherein the first fastener is sewn in the central slot of the elongated slat by the two sewing threads.

In one embodiment of the present invention, a gap is formed between the inner surface of the elongated slat and the bottom surface of the channel portion.

In one embodiment of the present invention, the exposed sewing portion of each of the two sewing threads is discontinuously arranged at a single line close to a fastening region of the first fastener.

In one embodiment of the present invention, the two sewing threads are wear-resistant threads, such as nylon threads.

To achieve the above object, the present invention provides a side fastening assembly for a flexible tonneau cover system of a pick-up truck, which comprises: a first fastener sewn on an elongated slat by two sewing threads, wherein the elongated slat is slidably inserted in a channel portion of a side rail mounted on a side wall of a cargo bed of the pick-up truck, and each of the two sewing threads has an exposed sewing portion projected from an inner surface of the elongated slat to be in contact with a bottom surface of the channel portion; and a second fastener attached to a flexible cover material of a flexible cover assembly, wherein the first fastener and the second fastener are engaged with each other in a case that the flexible cover material is unrolled rearward on the side rail to cover the cargo bed.

In one embodiment of the present invention, the second fastener is attached to the flexible cover material by sewing threads, adhesives, chemical bonding, or fusion connection.

Moreover, the present invention provides another side fastening assembly for a flexible tonneau cover system of a pick-up truck which comprises: a first fastener sewn on an elongated slat by two sewing threads, wherein the elongated slat is slidably inserted in a channel portion of a side rail mounted on a side wall of a cargo bed of the pick-up truck, and each of the two sewing threads has an exposed sewing portion projected from an inner surface of the elongated slat to be in contact with a bottom surface of the channel portion.

In one embodiment of the present invention, further comprising: a second fastener attached to a flexible cover material of a flexible cover assembly, wherein the first fastener and the second fastener are engaged with each other in a case that the flexible cover material is unrolled rearward on the side rail to cover the cargo bed.

In one embodiment of the present invention, the second fastener is attached to the flexible cover material by sewing threads, adhesives, chemical bonding, or fusion connection.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

Referring now to FIGS. 4, 5, 6, 7 and 8, a side fastening assembly for a flexible tonneau cover system of a pick-up truck according to a preferred embodiment of the present invention is illustrated. As shown, a flexible tonneau cover system is installed on a cargo bed 11 of a pick-up truck 10, and the flexible tonneau cover system comprises a pair of side rails 20, a flexible cover assembly 30, a rear header guide 40, a plurality of clamps 50, a tension control assembly 70 and two side fastening systems 80, wherein the side rails 20, the flexible cover assembly 30, the rear header guide 40, the clamps 50 and the tension control assembly 70 are similar to that of the traditional flexible tonneau cover system, as shown in FIGS. 1 to 3.

Figure 4:
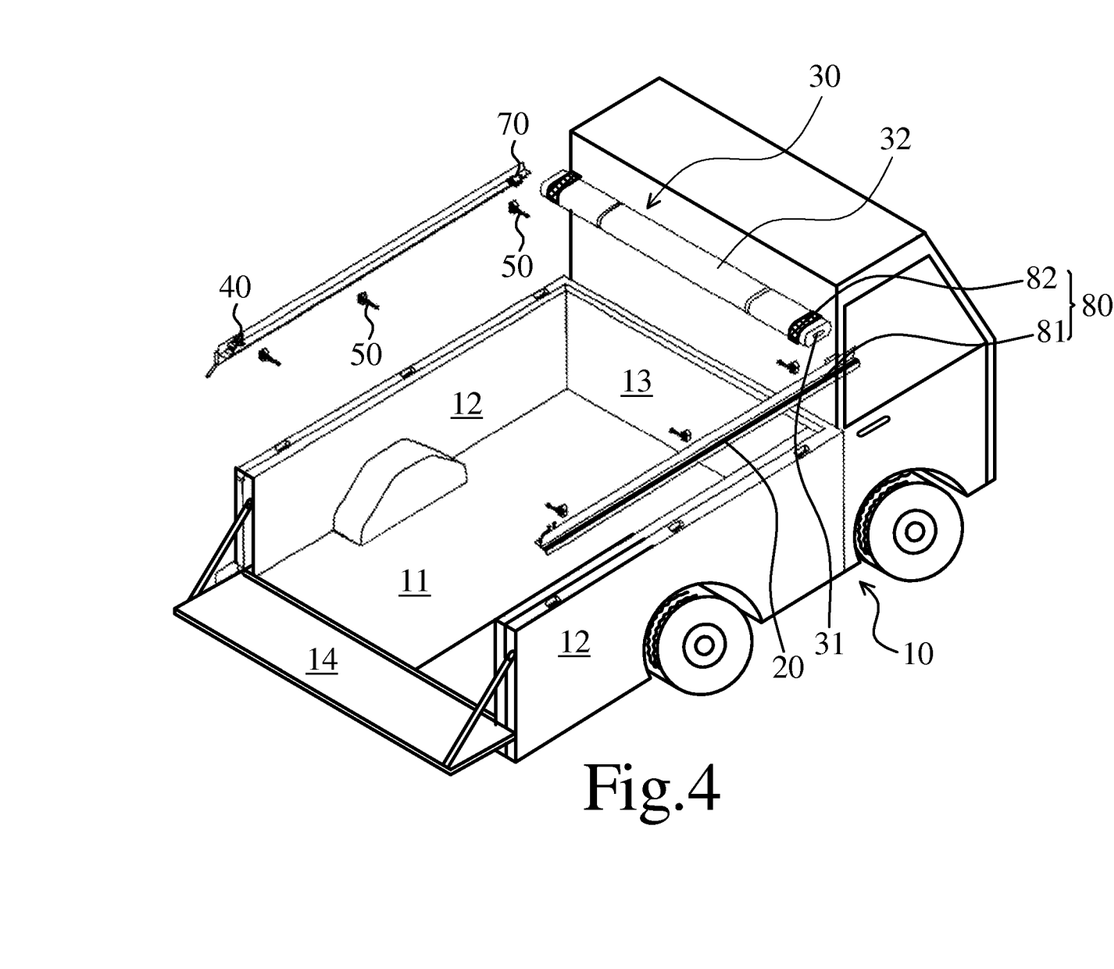
FIG. 4 is an exploded perspective view of a flexible tonneau cover system of a pick-up truck according to a preferred embodiment of the present invention.
Figure 5:
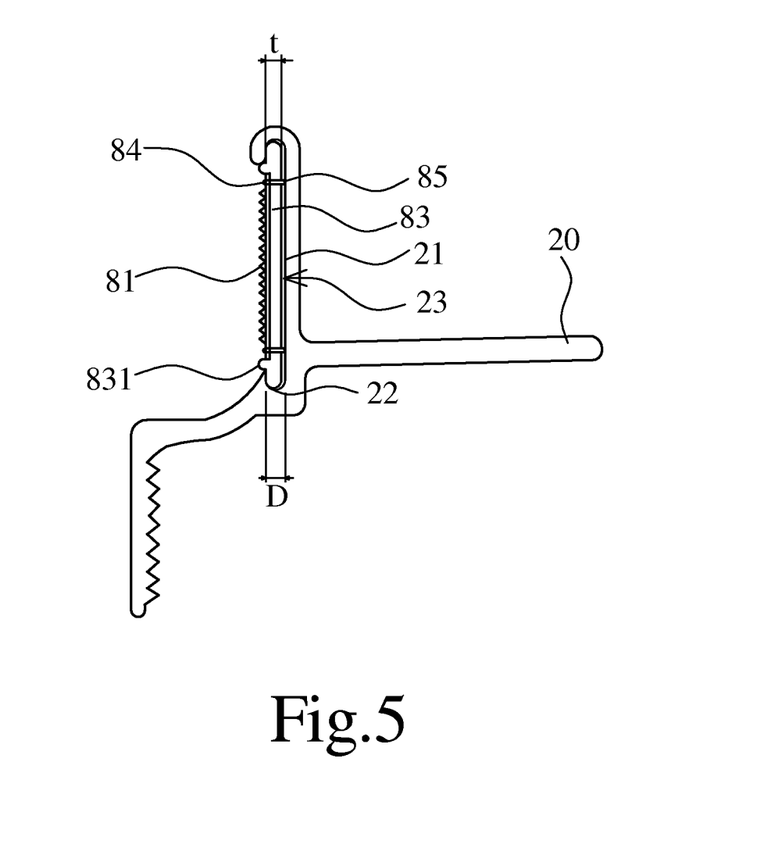
FIG. 5 is a partially cross-sectional view of a side rail and a first fastener of the flexible tonneau cover system according to the preferred embodiment of the present invention.
Figure 8:
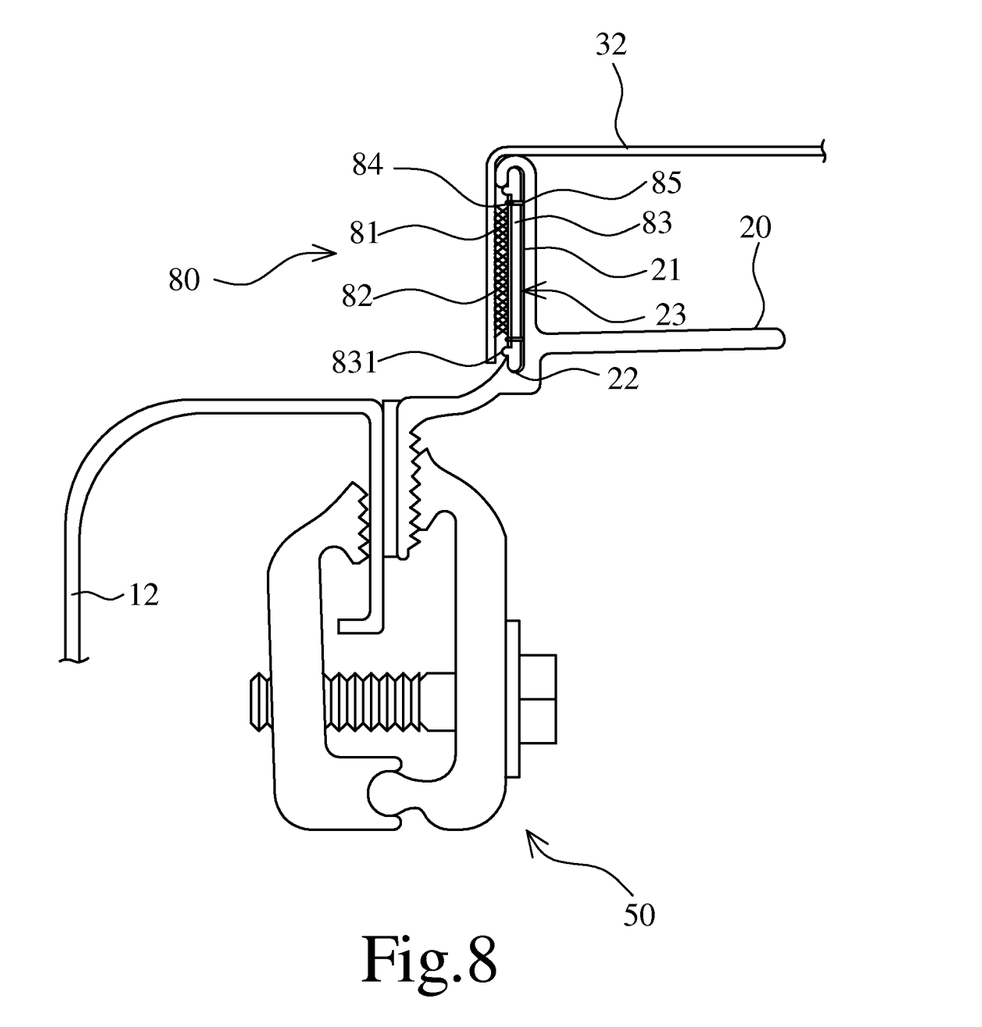
FIG. 8 is an assembled cross-sectional view of the flexible tonneau cover system according to the preferred embodiment of the present invention.

Referring to FIGS. 4, 5 and 8, the two side rails 20 are mounted on the top of two side walls 12 of the cargo bed 11 by the clamps 50. The flexible cover assembly 30 is mounted above a front wall 13 of the cargo bed 11. The rear header guide 40 is mounted on rear end of the two side rails 20 close to a tailgate 14 of the pick-up truck 10. The flexible cover assembly 30 has a front header 31, a flexible cover material 32 and a rear header (not-shown), wherein two ends of the front header 31 is installed on the front end of the two side rails 20. The flexible cover material 32 can be rolled up on the front header 31 or be unrolled rearward on the two side rails 20 to cover the cargo bed 11. The rear header can be engaged with or separated from the rear header guide 40. Furthermore, the tension control assembly 70 is used to automatically or manually control the tension of the flexible cover material 32, wherein the front header 31 will shift either slightly forward or slightly back, so as to achieve the desired tension. The tension can be adjusted to accommodate expansion or contraction of the flexible cover material 32 in response to climactic conditions.

Referring now to FIGS. 4, 5, 6, 7 and 8, in the preferred embodiment of the present invention, each of the two side fastening systems 80 has a first fastener 81 and a second fastener 82. The first fastener 81 is sewn on an elongated slat 83 by two sewing threads 84, and each of the two sewing threads 84 has an exposed sewing portion 85 exposed and projected from an inner surface of the elongated slat 83. Meanwhile, the second fastener 82 is attached to the flexible cover material 32 by sewing threads, adhesives, chemical bonding, or fusion connection.

The side fastening systems 80 are preferably Velcro-type fastener, i.e. a hook and loop fastening assembly. In one embodiment, the first fastener 81 can be selected from a hook fastener, and the second fastener 82 can be selected from a look fastener; and in another embodiment, the first fastener 81 can be selected from a loop fastener, and the second fastener 82 can be selected from a hook fastener, without limitation.

Figure 6:
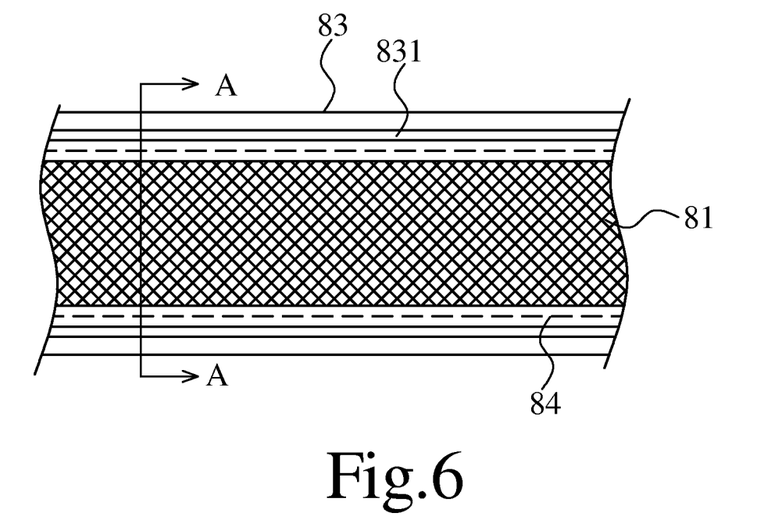
FIG. 6 is a front view of the first fastener of the flexible tonneau cover system according to the preferred embodiment of the present invention.
Figure 7:
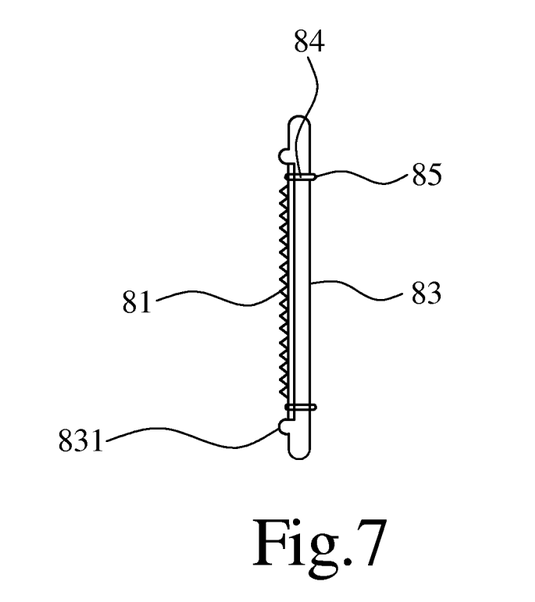
FIG. 7 is a cross-sectional view of the first fastener according to the preferred embodiment of the present invention, taken along the line A-A.

Furthermore, the elongated slat 83 is preferably a plastic plate or a plate made of other equivalent rigid material, wherein the elongated slat 83 is slidably inserted in a channel portion 21 of the side rail 20; and the elongated slat 83 has an outer surface formed with two longitudinally extending ridges 831 for commonly defining a central slot (unlabeled) therebetween, wherein the first fastener 81 is sewn in the central slot of the elongated slat 83 by the two sewing threads 84, and disposed between the two longitudinally extending ridges 831.

The two sewing threads 84 are preferably wear-resistant threads, such as nylon threads or other synthesized threads. In addition, the exposed sewing portion 85 is a portion of each of the two sewing threads 84 exposed and projected from an inner surface of the elongated slat 83. Preferably, each of the exposed sewing portions 85 is discontinuously arranged at a single line close to one side of a fastening region (i.e. a hook region or a loop region) of the first fastener 83.

Referring to FIGS. 5, 6 and 7, in the preferred embodiment of the present invention, the thickness "t" of the elongated slat 83 is smaller than the depth "D" of the channel portion 21 of the side rail 20, while the total thickness of the elongated slat 83 and the exposed sewing portions 85 is also slightly is smaller than the depth "D" of the channel portion 21. Thus, a gap 23 is formed between the inner surface of the elongated slat 83 and the bottom surface of the channel portion 21, i.e. the exposed sewing portions 85 can reduce the contact area between the inner surface of the elongated slat 83 and the bottom surface of the channel portion 21 of the side rail 20.

When the first fastener 81 and the elongated slat 83 are slidably inserted in the channel portion 21 of the side rail 20, only the exposed sewing portions 85 projected from the inner surface of the elongated slat 83 are in contact with a bottom surface of the channel portion 21 of the side rail 20. In other words, the inner surface of the elongated slat 83 will not be in contact with the bottom surface of the channel portion 21 of the side rail 20, and the elongated slat 83 will not be jammed due to the loose match relationship with the bottom surface of the channel portion 21. Meanwhile, an upper end and a lower end of the elongated slat 83 are also slightly in contact with and clamped by two curved surface 22 of the channel portion 21 to carry out a loose match relationship. As a result, the elongated slat 83 can smoothly and easily slide forward or backward in the channel portion 21, so as to increase the reliability of automatically or manually controlling the tension of a flexible cover material 32.

Moreover, referring now to FIGS. 4, 5 and 8, during rolling up the flexible cover material 32, the second fastener 82 must be separated from the first fastener 81 sewn on the elongated slat 83, wherein the sewing strength of the first fastener 81 and the elongated slat 83 is sufficient to prevent the separation force from peeling off the first fastener 81 from the elongated slat 83. After long-term use, the sewing strength will still maintain in a certain degree. As a result, the structure of first fastener 81 and the elongated slat 83 needs not be replaced by a new one, so that the first fastener 81 sewn on the elongated slat 83 can ensure the attachment strength of the first fastener 81, so as to elongate the lifetime of the first fastener 81 and lower the maintenance cost thereof.

As described above, in comparison with the traditional flexible tonneau cover system which has the first fastener 61 easily peeled off from the elongated slat 63 by the separation force, the side fastening assembly for a flexible tonneau cover system of a pick-up truck according to the present invention as shown in FIGS. 4 to 8 is provided with the first fastener 81 sewn on the elongated slat 83 by the two sewing threads 84, wherein the first fastener 81 sewn on the elongated slat 83 can ensure the attachment strength of the first fastener 81, so as to elongate the lifetime of the first fastener 81 and lower the maintenance cost thereof. Furthermore, each of the two sewing threads 84 on the first fastener 81 has an exposed sewing portion 85 projected from an inner surface of the elongated slat 83, so that the exposed sewing portion 85 reduces the contact area between the inner surface of the elongated slat 83 and the bottom surface of the channel portion 21 of the side rail 20. Thus, the elongated slat 83 can smoothly and easily slide forward and backward in the channel portion 21, so as to increase the smooth operation and reliability of automatically or manually controlling the tension of the flexible cover material 32.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A side fastening assembly for a flexible tonneau cover system of a pick-up truck, comprising:
   a first fastener sewn on an elongated slat by two sewing threads, wherein the elongated slat is slidably inserted in a channel portion of a side rail mounted on a side wall of a cargo bed of the pick-up truck, and each of the two sewing threads has an exposed sewing portion being discontinuously arranged at a single line close to a fastening region of the first fastener and projected from an inner surface of the elongated slat to be in contact with a bottom surface of the channel portion, wherein the exposed sewing portions reduce the contact area between the inner surface of the elongated slat and the bottom surface of the channel portion of the side rail; and
   a second fastener sewn on a flexible cover material of a flexible cover assembly, wherein the first fastener and the second fastener are engaged with each other in a case that the flexible cover material is unrolled rearward on the side rail to cover the cargo bed.

2. The side fastening assembly according to claim 1, wherein the first fastener is a hook fastener, and the second fastener is a loop fastener.

3. The side fastening assembly according to claim 1, wherein the first fastener is a loop fastener, and the second fastener is a hook fastener.

4. The side fastening assembly according to claim 1, wherein the elongated slat is a plastic plate having an outer surface formed with two longitudinally extending ridges for commonly defining a central slot therebetween, wherein the first fastener is sewn in the central slot of the elongated slat by the two sewing threads.

5. The side fastening assembly according to claim 4, wherein a gap is formed between the inner surface of the elongated slat and the bottom surface of the channel portion.

6. The side fastening assembly according to claim 1, wherein the two sewing threads are wear-resistant threads.

7. The side fastening assembly according to claim 6, wherein the wear-resistant threads are nylon threads.

8. A side fastening assembly for a flexible tonneau cover system of a pick-up truck, comprising:
a first fastener sewn on an elongated slat by two sewing threads, wherein the elongated slat is slidably inserted in a channel portion of a side rail mounted on a side wall of a cargo bed of the pick-up truck, and each of the two sewing threads has an exposed sewing portion being discontinuously arranged at a single line close to a fastening region of the first fastener and projected from an inner surface of the elongated slat to be in contact with a bottom surface of the channel portion, wherein the exposed sewing portions reduce the contact area between the inner surface of the elongated slat and the bottom surface of the channel portion of the side rail; and
a second fastener attached to a flexible cover material of a flexible cover assembly, wherein the first fastener and the second fastener are engaged with each other in a case that the flexible cover material is unrolled rearward on the side rail to cover the cargo bed.

9. The side fastening assembly according to claim 8, wherein the second fastener is attached to the flexible cover material by sewing threads, adhesives, chemical bonding, or fusion connection.

10. The side fastening assembly according to claim 8, wherein the elongated slat is a plastic plate having an outer surface formed with two longitudinally extending ridges for commonly defining a central slot therebetween, wherein the first fastener is sewn in the central slot of the elongated slat by the two sewing threads.

11. The side fastening assembly according to claim 10, wherein a gap is formed between the inner surface of the elongated slat and the bottom surface of the channel portion.

12. The side fastening assembly according to claim 8, wherein the two sewing threads are wear-resistant threads.

13. The side fastening assembly according to claim 12, wherein the wear-resistant threads are nylon threads.

14. A side fastening assembly for a flexible tonneau cover system of a pick-up truck, comprising:
a first fastener sewn on an elongated slat by two sewing threads, wherein the elongated slat is slidably inserted in a channel portion of a side rail mounted on a side wall of a cargo bed of the pick-up truck, and each of the two sewing threads has an exposed sewing portion being discontinuously arranged at a single line close to a fastening region of the first fastener and projected from an inner surface of the elongated slat to be in contact with a bottom surface of the channel portion, wherein the exposed sewing portions reduce the contact area between the inner surface of the elongated slat and the bottom surface of the channel portion of the side rail.

15. The side fastening assembly according to claim 14, wherein the elongated slat is a plastic plate having an outer surface formed with two longitudinally extending ridges for commonly defining a central slot therebetween, wherein the first fastener is sewn in the central slot of the elongated slat by the two sewing threads.

16. The side fastening assembly according to claim 15, wherein a gap is formed between the inner surface of the elongated slat and the bottom surface of the channel portion.

17. The side fastening assembly according to claim 14, wherein the two sewing threads are nylon threads.

* * * * *